Nov. 2, 1965    T. A. BILLINGS    3,215,174
BRUSH AND TREE CUTTING ATTACHMENT
Filed March 22, 1963    5 Sheets-Sheet 1

INVENTOR
Thomas A. Billings
BY Mason, Fenwick & Lawrence
ATTORNEYS

Nov. 2, 1965  T. A. BILLINGS  3,215,174
BRUSH AND TREE CUTTING ATTACHMENT
Filed March 22, 1963  5 Sheets-Sheet 2

INVENTOR
Thomas A. Billings

BY Mason, Fenwick & Lawrence
ATTORNEYS

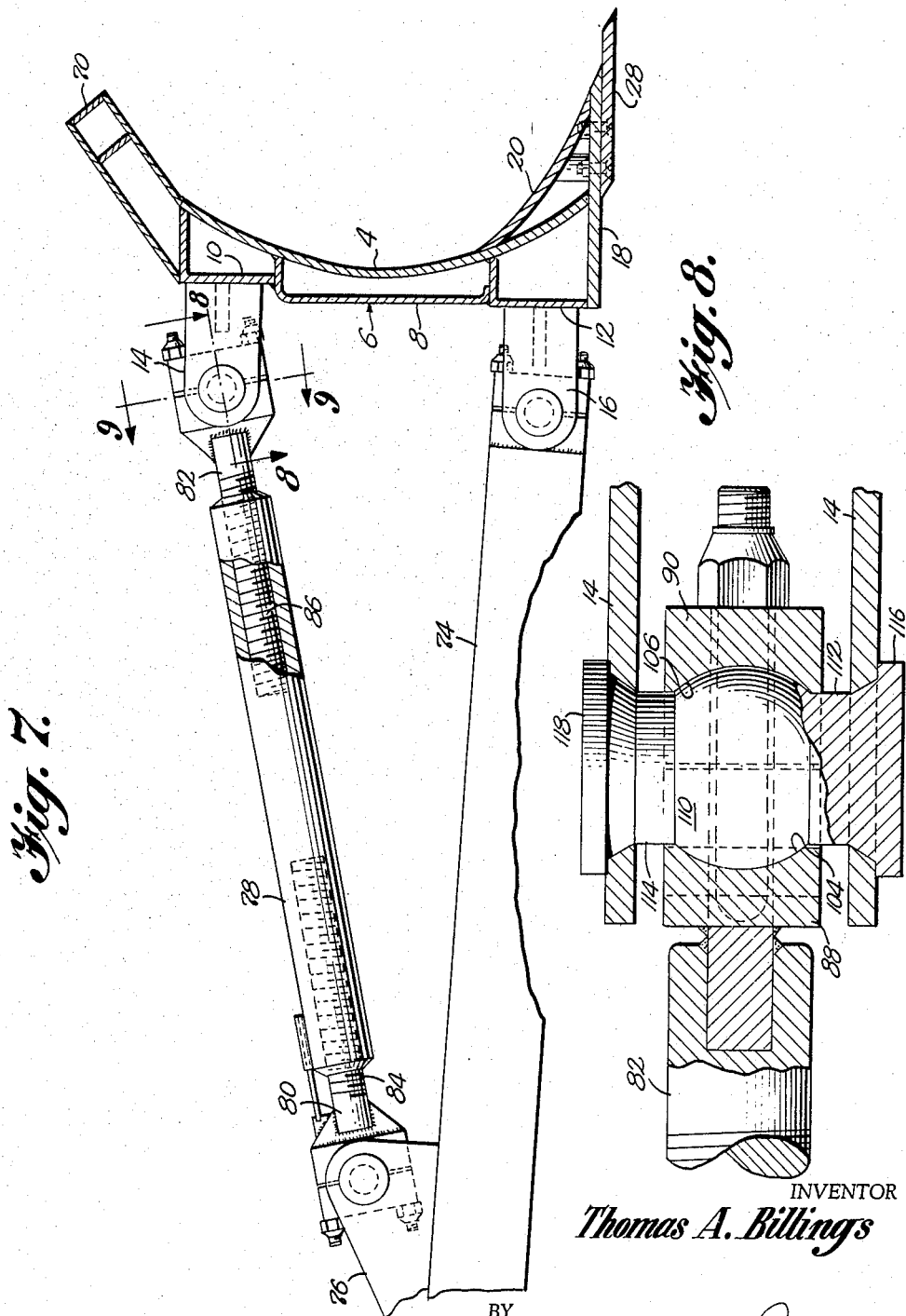

Nov. 2, 1965  T. A. BILLINGS  3,215,174
BRUSH AND TREE CUTTING ATTACHMENT
Filed March 22, 1963  5 Sheets-Sheet 4

INVENTOR
Thomas A. Billings

BY Mason, Fenwick & Lawrence
ATTORNEYS

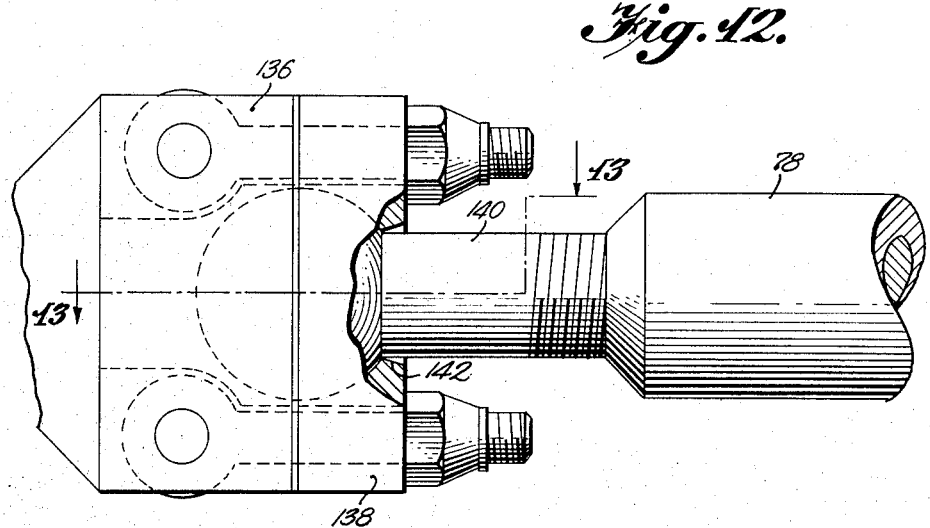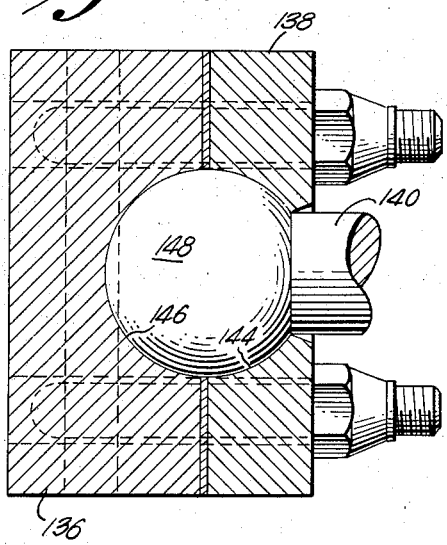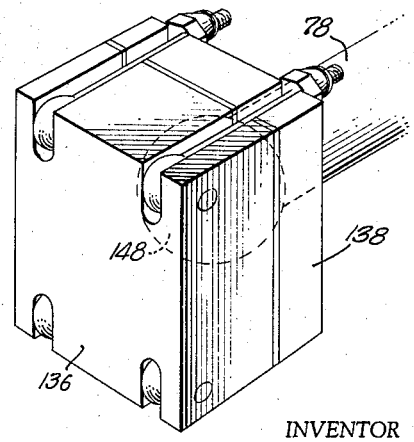

United States Patent Office 3,215,174
Patented Nov. 2, 1965

3,215,174
BRUSH AND TREE CUTTING ATTACHMENT
Thomas A. Billings, 685 Walker Drive, Orlando, Fla.
Filed Mar. 22, 1963, Ser. No. 267,131
5 Claims. (Cl. 144—34)

This invention relates to a brush and tree cutting apparatus and particularly to a brush and tree cutting attachment for tractors and other prime movers which is adapted to cut from small diameter saplings up to large diameter trees at or below ground level. This invention further contemplates a detachable tree splitting and cutting means which is adapted to be detachably secured to the brush and tree cutting attachment and also a push beam assembly having novel coupling means.

In the prior art there are many brush and tree cutting attachments for tractors and the like for cutting brush and trees at ground level. Such attachments generally comprise a bulldozer blade having a substantially horizontal, bottom shearing blade which is adapted to cut brush and small saplings, and also a forwardly projecting wedging member which can be utilized to split the trunks of trees having comparatively larger diameters. Most of these attachments are capable of being utilized in clearing areas having a variety of indigenous growth, including brush and trees of various diameters.

Such brush and trees cutting attachments often are employed in remote areas usually at a considerable distance from repair and maintenance facilities. Under such circumstances, it has been found that considerable delay is incurred whenever the shearing or wedging edges of the attachment become worn, and must be returned to the repair and maintenance facilities to be re-sharpened or replaced. The shear blade normally is sharpened; however, the tree splitting means normally must be cut off and replaced usually by welding. Considerable time and expense is incurred in either instance.

Accordingly, it is the general object of this invention to provide an improved shear type angled blade attachment for tractors and other prime movers for cutting brush and trees.

Another object of this invention is to provide a shear type angled blade attachment which is capable of splitting and cutting up to large diameter trees at or below ground level.

A further object of this invention is to provide an improved shear type angled blade attachment having a detachable shearing blade and a detachable means for splitting and cutting large diameter trees.

A still further object of this invention is to provide an improved shear type blade attachment for cutting brush and trees having a reversible shearing blade and a detachable means for splitting and cutting large diameter trees.

Another object of this invention is to provide an improved shear type blade attachment for cutting brush and trees having a reversible shearing blade and a means for splitting and cutting trees which can be readily replaced in the field.

A further object of this invention is to provide an improved shear type blade attachment for cutting brush and trees, including a reversible bottom cutting blade having fastening means which are readily accessible from the upper side of the attachment.

Another object of this invention is to provide a push beam assembly for the improved shear type blade attachment wherein the assembly is provided with novel coupling means.

A further object of this invention is to provide a push beam assembly for the improved shear type blade having means for adjusting the tilt of the blade about a transverse axis relative to the centerline of the tractor.

Other objects and advantages of the present invention will become apparent to those skilled in the art, from the following description when read in conjunction with the accompanying drawings, wherein:

FIGURE 7 is a side elevational view of the brush and tree cutting attachment mounted on the novel push beam assembly, having portions thereof broken away;

FIGURE 8 is an enlarged cross-sectional view taken along lines 8—8 in FIGURE 7;

FIGURE 12 shows an enlarged second embodiment of the coupling means having portions thereof broken away;

FIGURE 13 is a cross-sectional view taken along lines 13—13 in FIGURE 12;

FIGURE 14 is a perspective view of the second embodiment of the coupling means.

Figure 1:
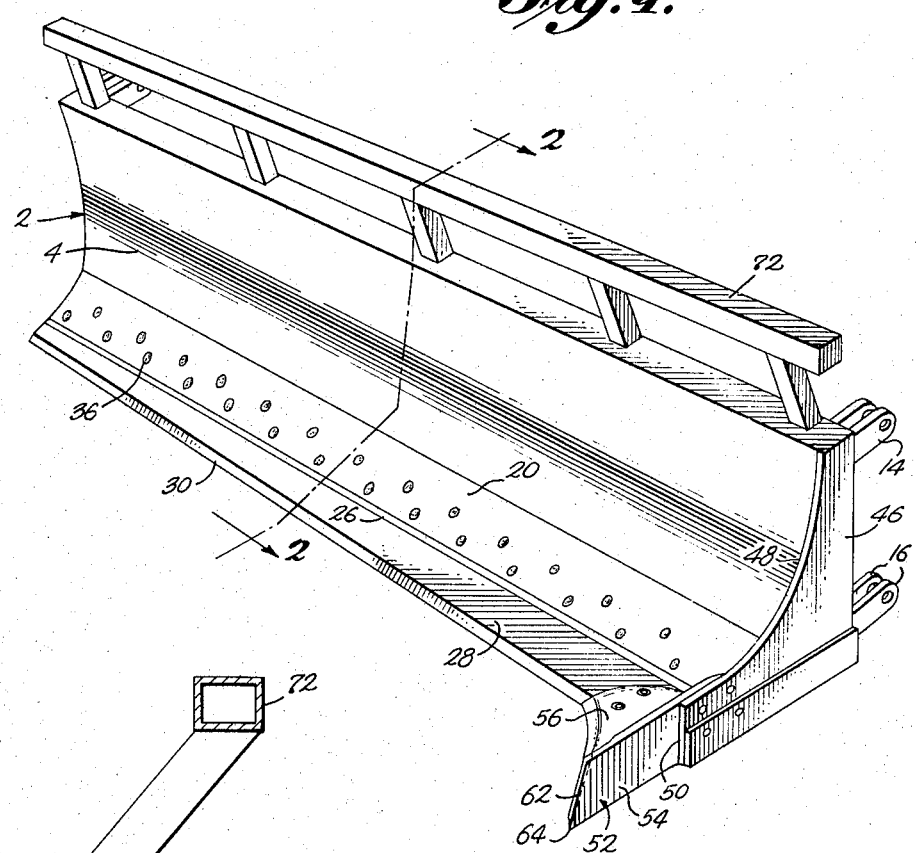
FIGURE 1 is a perspective view of the present invention.

In accordance with a first aspect of the present invention there is provided a brush and tree cutting attachment for tractors and prime movers, having a readily detachable bottom cutting blade and a detachable tree splitting and cutting member. Referring to the drawings, there is shown a brush and tree cutting attachment 2 comprising a conventional bulldozer blade 4 mounted on the front of a frame 6. The frame 6 consists of a longitudinally extending intermediate channel shaped section 8 having longitudinally extending angle shaped upper and lower sections 10 and 12. Secured to the frame 6 are two sets of upper and lower mounting lugs 14 and 16 which are suitable for attaching the attachment to the front end of a tractor or other like prime mover by means of a novel push beam assembly hereinafter to be described.

Figure 2:
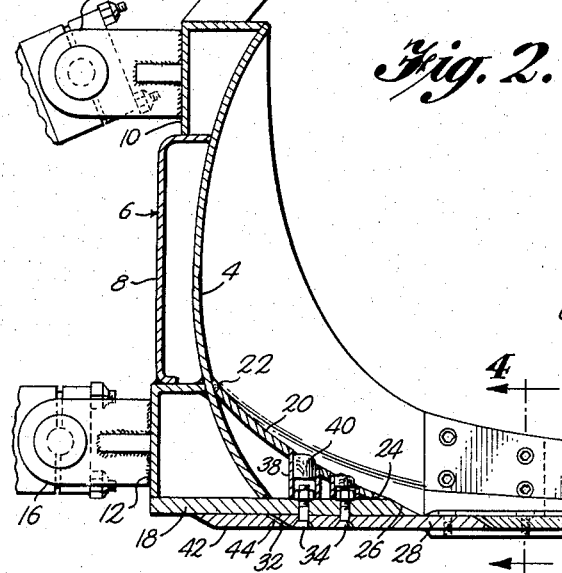
FIGURE 2 is an enlarged cross-section view taken along lines 2—2 of FIGURE 1.
Figure 3:
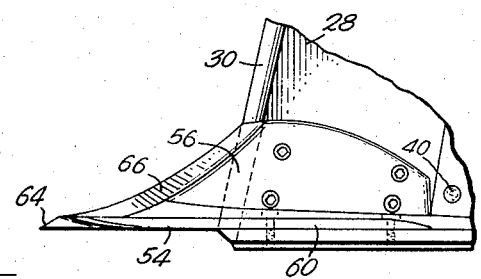
FIGURE 3 is an enlarged fragmentary top view of the invention showing the detachable tree splitting and cutting means.

Referring to FIGURE 2, an elongated, substantially rectangular shaped bottom mounting plate 18 is disposed on the bottom of the bulldozer blade 4 and the lower angle shaped frame section 12. The bottom mounting plate 18 is secured to the bottom edges of the bulldozer plate and bottom frame section 12 by welding or any other suitable means. Bridging the bulldozer plate 4 and the bottom mounting plate 18 is a longitudinally extending curved reinforcing member 20 so that the bottom edge of the curved reinforcing plate 20 lies adjacent the front edge of the bottom mounting plate 18. The reinforcing plate 20 is welded to the bulldozer plate 4 and the bottom mounting plate 18, as at 22 and 24, to provide a continuous curved surface with the bulldozer plate 4. The forward edge 26 of the bottom mounting plate 18 is beveled so as to provide a continuous surface with the reinforcing plate 20.

Mounted on the under side of the bottom mounting plate 18 and extending forwardly of the forward edge of the mounting plate 18 is a reversible bottom cutting blade 28 having a front cutting edge 30 and a rear cutting edge 32. The bottom cutting blade 28 is attached to the bottom mounting plate 18 so that the front cutting edge 30 tapers along its longitudinal length at an angle of approximately five degrees relative to the junction line of the bottom mounting plate 18 and the reversible bottom cutting blade 28, as best shown in FIGURE 1. The bottom cutting blade 28 is detachably secured to the mounting plate 18 by means of a plurality of longitudinally spaced bolt fasteners 34 which are inserted from the bottom side of the attachment. The reinforcing plate 20 is provided with a plurality of access openings 36 conforming in spacing and number to the bolt fasteners 34. Each of the bolt fasteners 34 is provided with a tubular member 38, which extends from a corresponding access opening 36 in the reinforcing plate 20 to the mounting plate 18 to provide an access passageway to the bolt fasteners 34 from the upper side of the attachment. Each of the access passageways is provided with a plug 40 made of cork or any other suitable material which is readily removable, and which acts to prevent foreign matter from accumulating in the interior of the tubes 38, thus protecting the upper ends of the bolt fasteners from the effects of abrasion and clogging. The bottom mounting plate 18 is also provided with a longitudinally extending guard plate 42 having a beveled front edge 44 which is adapted to receive and thus protect the rearwardly disposed cutting edge 32 of the reversible bottom cutting blade 28.

Disposed on the side of the attachment 4 at the leading end of the reversible bottom cutting blade 28 is a vertical side plate 46. The side plate 46 is secured to the attachment by welding or any other suitable means, and is provided with a downwardly and forwardly curved top edge 48 and a vertical front edge 50.

Figure 4:
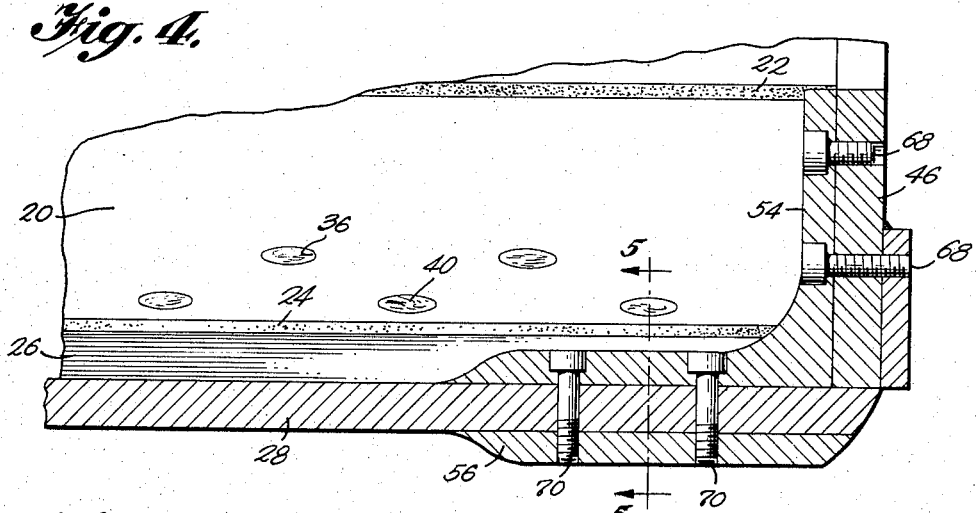
FIGURE 4 is an enlarged cross-section view taken along lines 4—4 of FIGURE 2.
Figure 5:
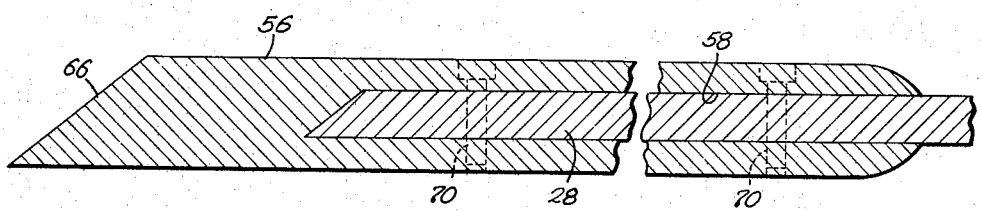
FIGURE 5 is an enlarged cross-section view taken along lines 5—5 of FIGURE 4.
Figure 6:
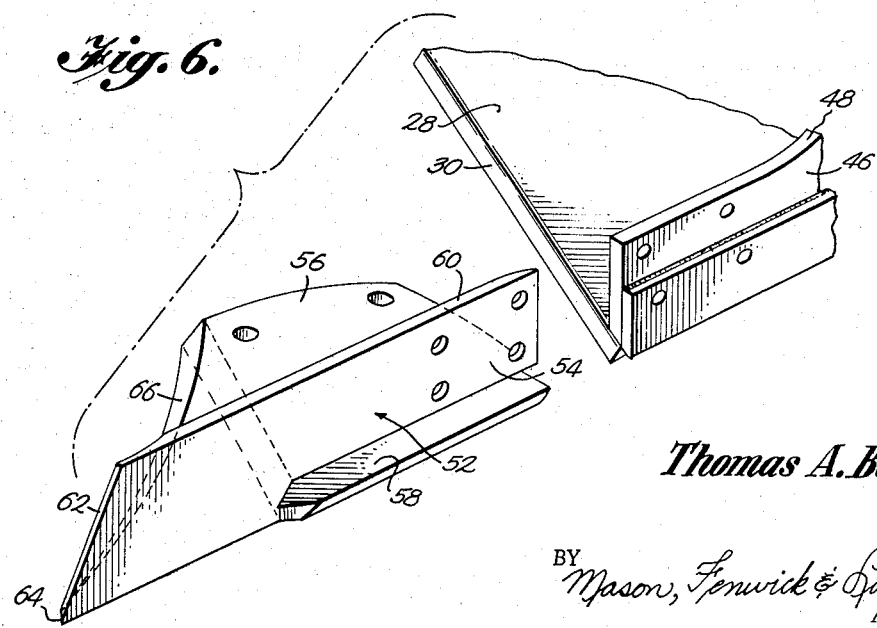
FIGURE 6 is an enlarged fragmentary exploded perspective view of the present invention showing the detachable tree splitting and cutting member in relation with the leading end of the bottom cutting blade of the attachment.

The tree splitting and cutting member 52 comprises a vertical portion 54 formed integral with a horizontal portion 56. The horizontal portion 56 is provided with a horizontal recess 58, as best shown in FIGURES 4 through 6, which conforms with and is adapted to receive the leading end of the reversible bottom cutting blade 28. The vertical portion 54 has a substantially horizontal top edge 60 which substantially merges with the top edge 48 of the side plate 46. The vertical portion 54 is also provided with a forwardly and downwardly extending cutting edge 62, which terminates at a forwardly disposed point 64. The horizontal portion 56 is provided with a concavely curved front cutting edge 66 which merges at one end with the front cutting edge 30 of the reversible bottom cutting blade 28 to provide a continuous substantially horizontal shearing edge and merges at the opposite end thereof at the forwardly disposed terminating point 64 of the forwardly and downwardly cutting surface 62 of the vertical portion 54.

The tree splitting and cutting member 52 is mounted on the leading edge of the reversible bottom cutting blade 28 by slipping the horizontal portion 56 onto the reversible bottom cutting blade 28, so that the blade 28 is received in the horizontal recess 58 and the vertical portion 54 abuts the inner surface of the side plate 46. The tree splitting and cutting member 52 is then secured by a plurality of standard high-tensile plow bolts 68 which fasten the vertical portion 54 to the side plate 46, and a plurality of plow bolts 70 which fasten the horizontal portion 56 to the reversible bottom cutting blade 28. As shown in FIGURE 4, all of the bolt holes are countersunk so that the top surfaces of the bolts are flush with the surfaces of the tree splitting and cutting member 52. It also will be appreciated that the horizontal portion 56 is provided with top and bottom surfaces having contours which merge with the top and bottom surfaces of the reversible bottom cutting blade 28. Similarly, the vertical portion 54 is provided with an inward surface having a contour substantially merging with the inner surface of the side plate 46.

The present invention can be utilized to cut brush and small diameter soft wood trees at or below ground level, by the use of the reversible bottom cutting blade 28. The attachment 4, as shown in FIGURES 1 and 2, is provided with a brush guard rail 72 which prevents brush or trees from falling rearwardly towards the operator of the tractor. To cut larger diameter trees in the order of fifteen inches in diameter and larger, the tree splitting and cutting member 54 is utilized. The member 52 is utilized in the conventional manner by driving the pointed wedge portion into the tree to split the tree, whereas, the inward portion of the tree relative to the reversible bottom cutting blade 28 is cut by means of the concavely curved front cutting edge 66 of the horizontal portion 56. Depending upon the diameter of the tree, two or more passes would be required until the entire tree is successively split and cut. It will be appreciated that the brush and tree cutting attachment 4 can be utilized in remote areas to cut a variety of indigenous growth ranging from brush and small diameter trees which are readily cut at or below ground level by the reversible bottom cutting blade 28 up to large diameter trees having diameters in excess of fifteen inches, which can be split and cut by the use of the tree splitting and cutting member 52.

It will further be appreciated that the present invention provides an additional distinct advantage of having reversible and replaceable cutting implements which can readily be detached, reversed or replaced in remote areas with a minimum amount of delay. To replace the tree splitting and cutting member 52 requires only the removal of the plow bolts 68 and 70 and the replacement thereof with a new member having sharpened cutting edges. To provide a new cutting edge for the reversible bottom cutting blade 28 requires only the reversal of the reversible bottom cutting blade 28. To accomplish this, the plugs 40 are removed and a suitable tool is inserted through the access openings 36, to remove the nuts on the bolt fasteners 34 supporting the reversible bottom cutting blade 28 on the under side of the bottom mounting plate 28. As soon as the nuts on the bolt fasteners 34 have been removed, the attachment is raised slightly so that the reversible bottom cutting blade 28 drops and separates from the mounting plate. The blade is then reversed and the bolts 34 are again utilized to mount the blade on the mounting plate 18.

According to another aspect of the present invention there is provided a novel push beam assembly having a novel quick disconnect coupling means for attaching the brush and tree cutting attachment to the tractor or other prime mover. Referring to FIGURE 7, the assembly comprises a push arm 74 having the front end thereof operatively connected to either of the lower mounting lugs 16 and the rear end thereof operatively connected to a suitable mounting on the tractor, by means of the novel quick disconnect coupling means. The push arm can be of any length or cross-sectional shape and is provided toward its rearward end with a suitably apertured upstanding bracket 76. Interconnecting the bracket 76 of a push arm and an associated set of upper mounting lugs 14 by means of the quick disconnect coupling means is a tilt strut 78. Each tilt strut is provided with an axial bore being internally threaded at either end thereof for receiving in threaded engagement stem members 80 and 82 having threaded portions 84 and 86, respectively. The stem members are operatively connected to the coupling means as will hereinafter be described.

Figure 9:
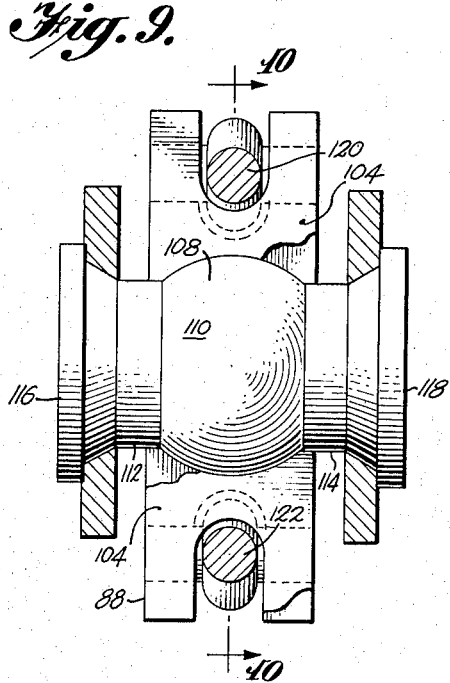
FIGURE 9 is an enlarged cross-sectional view taken along lines 9—9 in FIGURE 7, having portions thereof broken away.
Figure 10:
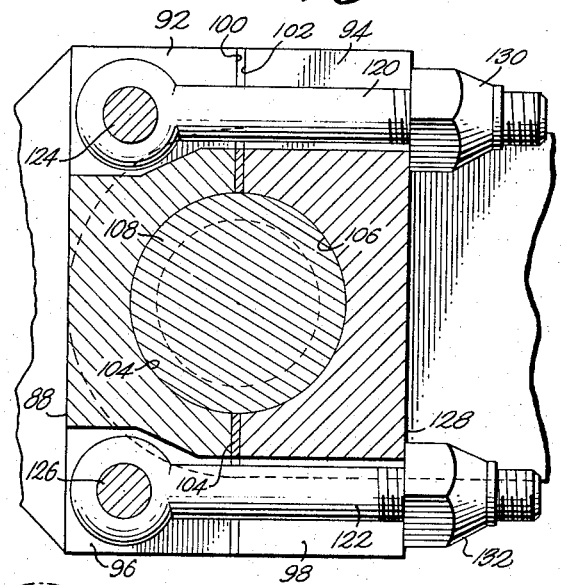
FIGURE 10 is an enlarged cross-sectional view taken along lines 10—10 in FIGURE 9.

Referring to FIGURES 8-10, there is shown a first embodiment of the novel quick disconnect coupling means preferably used to connect the tilt strut to the attachment or the push arm comprising a base member 88 rigidly secured to the stem member 82 and a complementary cap member 90. The base member 88 and the cap member 90 are provided with aligned recesses 92 and 94 in the top surfaces thereof and aligned recesses 96 and 98 in the bottom surfaces thereof, respectively, when the face portions 100 and 102 of the members are in abutment with each other or a suitable shim 104 is interposed therebetween.

The face portions 100 and 102 of the complementary coupling members are provided with complementary recesses 104 and 106 having intermediate spherical contours for accommodating the central spherical shaped portion 108 of a bridging member 110 which is supported in the apertured lugs 14. The bridging member 110 is provided with neck portions 112 and 114 which extend through and are supported in the lug openings, terminating in annular flange portions 116 and 118 for fixing the bridging member with respect to the mounting lugs. It is to be understood that any type of suitably configured member interconnecting the ears of the lugs and adapted to be received by a suitable pair of cap and base members as contemplated can be used.

The cap and base members having the bridging member received therethrough, as shown in FIGURES 8–10, are locked together by means of swivel bolts 120 and 122 which are pivotally connected in recesses 92 and 96 in base member 88 at at 124 and 126, respectively. The swivel bolts are adapted to swivel into and out respective aligned recesses in the cap and base members and are provided with lengths sufficient to bridge the base and cap members having threaded portions projecting beyond the front surface 128 of the cap member. Suitable locking nuts 130 and 132 are provided for locking the members together while embracing the connecting member.

It will be appreciated that with the coupling means assembled as shown in FIGURES 7–10, the tilt strut being threadedly connected thereto can be rotated to adjust the brush and tree cutting attachment to any desired degree of tilt about a transversely extending axis passing through the pivotal connection of the coupling means of the push beam to the attachment. It further will be appreciated that the coupling means permits an angular movement of the tilt strut relative to the attachment to facilitate the tilt adjustment.

Figure 11:
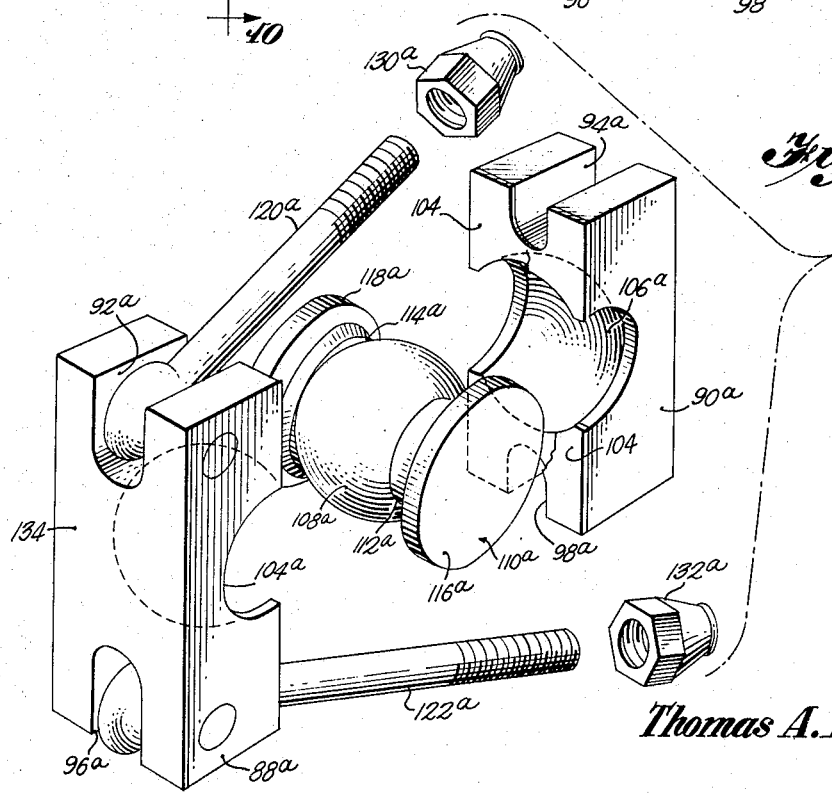
FIGURE 11 is an enlarged fragmentary exploded view of a modified coupling means of the push beam assembly having parts in section similar to the means shown in FIGURES 8–10.

In FIGURE 11 there is shown an exploded view of a slightly modified form of the coupling means shown in FIGURES 8–10. This modified form shows the base member with plane mounting surface 134 which facilitates the mounting thereof onto a complementary plane surface such as the front end of the push arm by welding or other suitable means.

Referring to FIGURES 12–14, there is shown a second embodiment of the quick disconnect coupling means which comprises a base member 136 and a complementary cap member 138 having aligned pairs of slots in the top and bottom surfaces thereof to accommodate swivel bolts for locking the members together similarly as described in connection with the first mentioned embodiment. In such an embodiment, the base member 136 is adapted to be secured to the attachment at any suitable location. The cap member 138 is adapted to be mounted for axial movement on a stem member 140 which extends through an opening 142 in the cap member communicating with a spherical recess 144 therein which when cooperating with spherical recess 146 in the base member provides a spherical cavity adapted to accommodate a spherical shaped end portion 148 of the stem member 140. As best shown in FIGURES 12 and 13, it will be noted that the openings 142 are tapered outwardly to accommodate limited universal movement of the tilt strut 78 relative to the locked cap and base members.

With reference to all of the various embodiments of the quick disconnect coupling means, it will be appreciated that an attachment as hereinbefore described utilizing such coupling means can be readily detached from the push beam assembly by the simple operation of loosening the locking nuts on the swivel bolts, swinging the bolts out of the aligned recesses and separating the base and cap members. Adjusting the tilt of the attachment while attached to the push beam assembly can be accomplished as previously mentioned by simply rotating the tilt strut which acts as a conventional turnbuckle.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What I claim is:

1. A brush and tree cutting attachment comprising a bulldozer blade, a substantially horizontal planiform mounting plate mounted on the bottom of said bulldozer blade, a reversible cutting blade having a cross-sectional configuration defining horizontal upper and lower surfaces and forward and rearward cutting edges, means detachably securing said cutting blade to the bottom of said mounting plate with its upper surface in rearwardly overlapping engagement with said mountting plate and a guard plate mounted on the bottom of said mounting plate and rearwardly of said cutting blade in horizontal alignment therewith, having a front edge shaped relative to said rearward cutting edge of said cutting blade located in closely adjacent protective relation therewith when said cutting blade is secured to the bottom of said mounting plate.

2. A brush and three cutting attachment comprising a bulldozer blade, a substantially horizontal planiform mounting plate mounted on the bottom of said bulldozer blade, a reversible cutting blade having a cross-sectional configuration defining horizontal upper and lower surfaces and forward and rearward inclined cutting edges, means detachably securing said cutting blade to the bottom of said mounting plate with its upper surface in rearwardly overlapping engagement with said mounting plate and a guard plate mounted on the bottom of said mounting plate and rearwardly of said cutting blade in horizontal alignment therewith, having an inclined front edge located in closed adjacent protective relation with the rearward inclined cutting edge of said cutting blade when said cutting blade is secured to the bottom of said mounting plate.

3. A brush an dtree cutting attachment comprising a bulldozer blade, a substantially horizontal planiform mounting plate mounted on the bottom of said bulldozer blade, a reversible cutting blade having a cross-sectional configuration defining a rhomboid having horizontal upper and lower surfaces and forward and rearward inclined cuttting edges, means detachably securing said cutting blade to the bottom of said mounting plate with its upper surface in rearwardly overlapping engagement with said mounting plate and a guard plate mounted on the bottom of said mounting plate and rearwardly of said cutting blade in horizontal alignment therewith, having an inclined front edge located in parallel, closely adjacent protective relation with the rearward inclined cutting edge of said cutting blade when said cutting blade is secured to the bottom of said mounting plate.

4. A brush and tree cutting attachment comprising a bulldozer blade, a substantially horizontal planiform mounting plate mounted on the bottom of said bulldozer blade, said mounting plate being mounted on the bottom edge of said bulldozer blade, between the forward and rearward ends thereof, reinforcing means disposed between the rearward end of said mounting plate and said bulldozer blade, a curved reinforcing plate having a rearward edge thereof secured to the bulldozer blade and the forward edge thereof secured to the mounting plate adjacent the forward end thereof, a reversible cutting blade having a cross-sectional configuration defining horizontal upper and lower surfaces and forward and rearward inclined cutting edges, means detachably securing said cutting blade to the bottom of said mounting plate with its upper surface in rearwardly overlapping engagement with said mounting plate and a guard plate mounted on the bottom of said mounting plate and rearwardly of said cutting blade in horizontal alignment therewith, having an inclined forward edge located in closely adjacent protective relation with the rearward inclined cutting edge of said cutting blade when said cutting blade is secured to the bottom of said mounting plate.

5. A brush and tree cutting attachment comprising a bulldozer blade, a substantially horizontal planiform mounting plate mounted on the bottom of said bulldozer blade, said mounting plate being mounted on the bottom edge of said bulldozer blade, between the forward and rearward ends thereof, reinforcing means disposed between the reaward end of said mounting plate and said bulldozer blade, a curved reinforcing plate having a rearward end thereof secured to the bulldozer blade and the forward edge thereof secured to the mounting plate adjacent the forward end thereof, a reversible cutting blade having a cross-sectional configuration defining a rhomboid having horizontal upper and lower surfaces and forward and rearward inclined cutting edges, means detachably securing said cutting blade to the bottom of said mounting plate with its upper surface in rearwardly overlapping engagement with said mounting plate and a guard plate mounted on the bottom of said mounting plate and rearwardly of said cutting blade in horizontal alignment therewith, having an inclined front edge located in parallel, closely adjacent protective relation with the rearward inclined cutting edge of said cutting blade when said cutting blade is secured to the bottom of said mounting plate.

References Cited by the Examiner

UNITED STATES PATENTS

| | | | |
|---|---|---|---|
| 2,311,553 | 2/43 | Tourneau | 37—144 |
| 2,322,115 | 6/43 | Cox et al. | 144—34 |
| 2,485,407 | 10/49 | Peterson | 144—34 |
| 2,652,869 | 9/53 | Goodman et al. | 144—34 |
| 2,681,518 | 6/54 | Troop | 37—144 |
| 2,701,591 | 2/55 | Kissner et al. | 144—34 |
| 2,722,758 | 11/55 | Loftin et al. | 144—34 |
| 2,894,544 | 7/59 | Billings | 144—34 |
| 2,934,109 | 4/60 | Bles | 144—34 |
| 2,965,989 | 12/60 | Hibbard | 37—143 |
| 3,029,534 | 4/62 | Rakisits | 37—143 |
| 3,126,927 | 3/63 | Swanson et al. | 144—34 |

FOREIGN PATENTS

| | | |
|---|---|---|
| 7,255 | 3/04 | Great Britain. |

ROBERT C. RIORDON, *Primary Examiner.*

WILLIAM W. DYER, Jr., LESTER M. SWINGLE,
*Examiners.*